United States Patent [19]
Holland

[11] 3,794,194
[45] Feb. 26, 1974

[54] SELF-UNLOADING MATERIAL DELIVERY SYSTEM

[75] Inventor: John H. Holland, Norman, Okla.

[73] Assignee: Arkansas Rock and Gravel Company, Murfreeboro, Ark.

[22] Filed: Dec. 1, 1971

[21] Appl. No.: 203,739

[52] U.S. Cl. .......................................... 214/83.36
[51] Int. Cl............................................. B60p 1/38
[58] Field of Search............ 214/17 D, 83.18, 83.36; 198/37, 40; 222/47, 49

[56] References Cited
UNITED STATES PATENTS
2,756,887  7/1956  Raney et al...................... 198/37 X
FOREIGN PATENTS OR APPLICATIONS
1,024,364  3/1966  Great Britain.................. 214/83.36
1,142,370  2/1969  Great Britain.................. 214/83.36

*Primary Examiner*—Robert G. Sheridan

[57] ABSTRACT

A self-unloading particulate material delivery system includes a material receiving hopper comprised of a front wall and side walls that slope inwardly and downwardly and a floor positioned beneath the lower ends of the walls. The rear of the hopper is open and the side walls and the floor extend beyond the rear of the hopper to form a discharge chute. A conveyor includes a pair of drive chains and a plurality of flights connected between the drive chains for movement thereby around a course extending through the hopper and the chute to unload material from the hopper. A flow indicator comprises a plate pivotally supported at the rear of the chute for actuation by material moving therethrough under the action of the conveyor to provide an output indicative of the rate of flow of material out of the delivery system. A flight locator includes a lever mounted in the path of the flights of the conveyor to provide an output indicative of the positioning of the conveyor flights relative to the course of the conveyor.

13 Claims, 7 Drawing Figures

PATENTED FEB 26 1974 3,794,194

SELF-UNLOADING MATERIAL DELIVERY SYSTEM

BACKGROUND AND SUMMARY OF THE INVENTION

This invention relates to a self-unloading particulate material delivery system, and more particularly to a particulate material delivery system having improved unloading control means.

The co-pending application of John H. Holland, Ser. No. 852,345, Filed Aug. 22, 1969, now U.S. Pat. No. 3,647,096, relates to a material delivery system wherein a semitrailer chassis is supported at the rear end by wheels and at the front end by a tractor. The chassis includes a particulate material receiving hopper situated ahead of the wheels and comprising front and side walls that slope generally downwardly and inwardly and a floor that extends between the lower ends of the walls. A conveyor comprising a pair of drive chains and a plurality of flights connected between the drive chains is mounted for movement around a course extending under the lower end of the front wall and rearwardly through the hopper just above the floor. A baffle having downwardly and outwardly sloping surfaces extends through the hopper parallel to and above the conveyor and functions to create a zone of increased horizontal pressure in particulate material in the hopper tending to cause bridging of the material and to create a zone of reduced horizontal pressure just beneath the increased pressure zone tending to prevent bridging and providing a preferential shear zone in the particulate material. The rear of the hopper is open at least to the height of the preferential shear zone and the side walls and the floor of the hopper extend rearwardly beyond the wheels to form a discharge chute. The course of the conveyor extends through the chute so that upon operation of the conveyor, particulate material is transported out of the hopper and through the chute at a depth corresponding to the vertical positioning of the baffle in the hopper.

In the use of the foregoing Holland invention it has been discovered that certain additional features are highly desirable in providing more precise control over the unloading of particulate material. For example, although the quantity of material that is unloaded per increment of conveyor travel depends on the vertical positioning of the baffle in the hopper, the rate at which material is unloaded depends on the speed of operation of the conveyor. If the material is being unloaded into a paving material lay down machine or the like, it is advantageous to deliver the material at the same rate that the material is being used by the lay down machine. Similarly, during windrowing and the like, it is necessary to unload material at a particular rate. It has therefore been found to be highly desirable to provide structure for indicating the rate at which material is being unloaded from a material delivery system incorporating the Holland invention.

It has also been discovered that it is highly advantageous to provide a material delivery system incorporating the Holland invention with structure for indicating the positioning of the conveyor flights relative to the course of the conveyor. This permits locating one of the flights between the lower end of the front wall and the floor of the hopper to form a seal at the front end of the hopper. Also, by determining total conveyor travel following actuation of the conveyor it is possible to control the initiation of the flow of particulate material out of the chute under the action of the conveyor.

The present invention comprises a self-unloading particulate material delivery system constructed in accordance with the above-identified Holland invention and incorporating the foregoing and other improvements. In accordance with the preferred embodiment of the invention, the member is pivotally supported at the rear of the semitrailer chassis and extends into the chute. The member is engaged by the upper surface of material flowing out of the chute under the action of the con-veyor to provide an output indicative of the rate of flow of material out of the hopper. Another member is supported for engagement by each conveyor flight as the flight passes a predetermined location on the course of the conveyor. This permits both positioning of a conveyor flight to seal the forward portion of the hopper and control over the start of flow out of the chute following actuation of the conveyor. The outputs produced by both of the members are preferably perceivable from the tractor so as to provide more complete control over the unloading of particulate material from the hopper.

DESCRIPTION OF THE DRAWINGS

A more complete understanding of the invention may be had by referring to the following Detailed Description when taken in conjunction with the accompanying Drawings, wherein.

DETAILED DESCRIPTION

Figure 1:
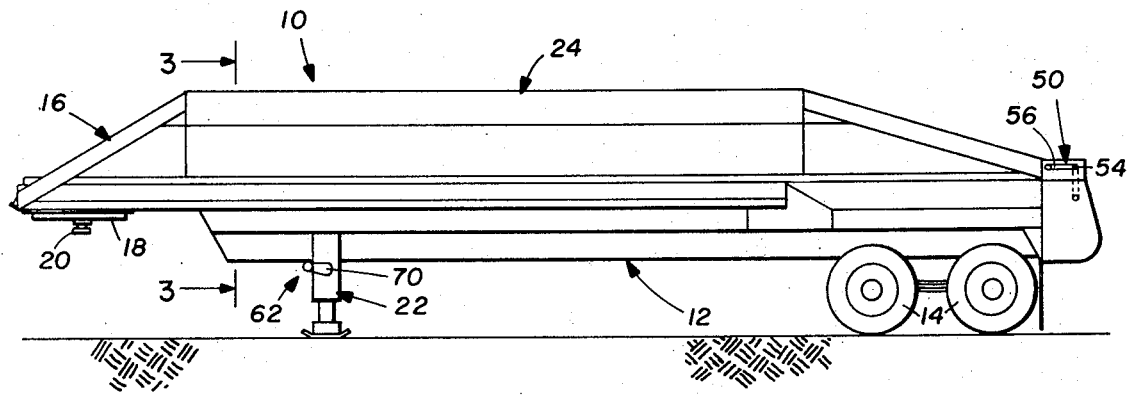
FIG. 1 is a side view of a self-unloading particulate material delivery system incorporating the preferred embodiment of the invention.

Referring now to the Drawings, and particularly to FIG. 1 thereof, there is shown a self-unloading particulate material delivery system 10 incorporating the preferred embodiment of the invention. The particulate material delivery system 10 comprises a semitrailer chassis 12 which is supported at the rear end by conventional wheel assemblies 14. The front end of the semitrailer chassis 12 comprises a gooseneck 16 which is equipped with a rocking bolster 18. The rocking bolster 18 is preferably constructed in accordance with the teaching of the co-pending application of John H. Holland, Ser. No. 187,456, Filed Oct. 7, 1971, and is equipped with a depending kingpin 20 adapted for cooperation with a conventional semitrailer contact plate on a tractor to connect the chassis 12 to the tractor. The semitrailer chassis 12 is also provided with a pair of conventional landing gears 22 which are adapted to support the front end of the chassis 12 whenever it is not connected to a tractor.

Figure 3:
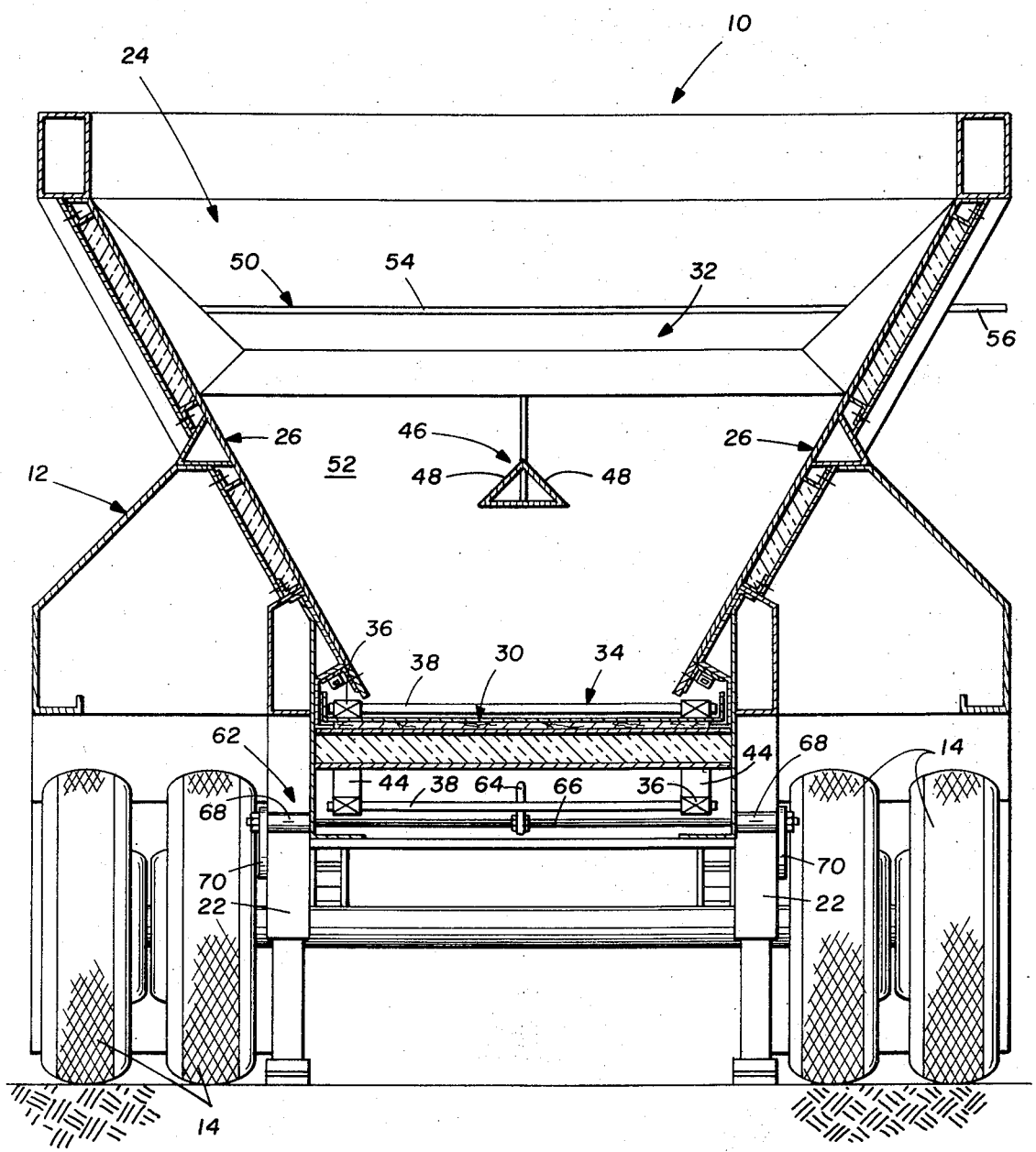
FIG. 3 is an enlarged sectional view taken generally along the line 3—3 in FIG. 1.
Figure 4:
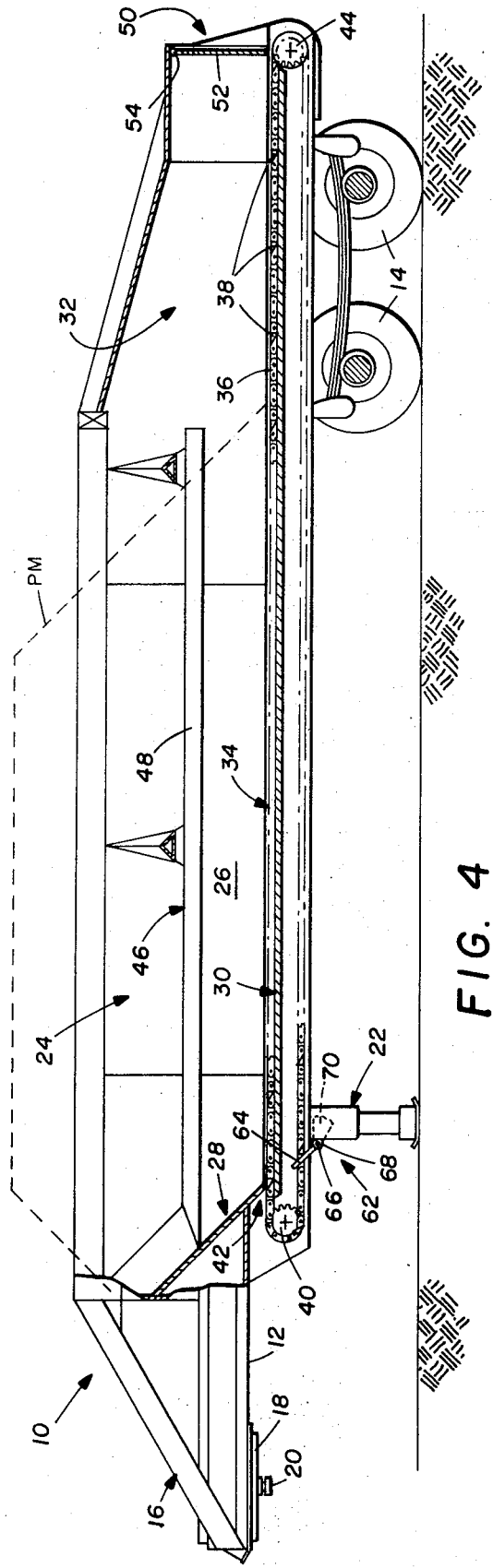
FIG. 4 is an enlarged sectional view taken generally along the line 4—4 in FIG. 2.

Referring now to FIGS. 3 and 4, the self-unloading particulate material delivery system 10 further includes a particulate material receiving hopper 24 which is situated between the gooseneck 16 and the wheel assemblies 14 of the semitrailer chassis 12. The particulate material receiving hopper 24 is comprised of generally inwardly and downwardly sloping side walls 26 and an inwardly and downwardly sloping front wall 28. A floor 30 is positioned beneath the lower ends of the side walls 26 and the front wall 28 to define the bottom of the hopper 24. The rear of the particulate material receiving hopper 24 is open, and the side walls 26 and the floors 30 extend beyond the rear of the hopper 24 to form a discharge chute 32. As is most clearly shown in FIG. 4, the chute 32 extends from the rear of the particulate material receiving hopper 24 to a point behind the wheel assemblies 14.

The self-unloading particulate material delivery system 10 is equipped with a conveyor 34 which functions to transport particulate material out of the particulate material receiving hopper 24 through the discharge chute 32. The conveyor 34 is preferably constructed in accordance with the teaching of the co-pending application of John H. Holland, Ser. No. 206,634, Filed Dec. 10, 1971, and comprises a pair of drive chains 36 and a plurality of flights 38 connected between the drive chains. As is most clearly shown in FIG. 4, the conveyor 34 is mounted for movement around a course which extends around a pair of forward sprockets 40, rearwardly through a gap 42 between the lower end of the front wall 28 and the floor 30, rearwardly through the bottom of the particulate material receiving hopper 24, rearwardly through the discharge chute 32, around a pair of rear sprockets 44, and then forwardly along a return course situated beneath the floor 30 of the material receiving hopper 24. The conveyor 34 is driven by a suitable drive system (not shown in FIG. 4) which is preferably of the variable speed variety so as to control the rate at which material is transported out of the particulate material receiving hopper 24 and through the chute 32 by the conveyor 34.

As is best shown in FIG. 3, a baffle 46 extends through the particulate material receiving hopper 24 parallel to and above the conveyor 34. The baffle 46 comprises a pair of downwardly and outwardly diverging walls 48 which cooperate with the downwardly and inwardly converging side walls 26 of the hopper 24 to create a zone of increased horizontal pressure tending to cause bridging of particulate material in the hopper. The baffle 46 also creates a zone of reduced horizontal pressure just below the increased horizontal pressure zone tending to prevent bridging and forming a preferential shear zone in particulate material in the hopper. This causes the conveyor 34 to transport material out of the hopper 34 at a constant depth corresponding to the positioning of the preferential shear zone, that is, at a depth corresponding to the vertical posi-tioning of the baffle 46 in the particulate material receiving hopper 24. Thus, whereas the quantity of particulate material that is unloaded per increment of travel of the conveyor 34 depends on the vertical positioning of the baffle 46, the rate at which particulate material is unloaded depends on the speed of operation of the conveyor 34. A more detailed understanding of the foregoing structural components of the self-unloading particulate material delivery system 10 may be had by referring to the above-identified Holland Pat. No. 3,647,096, the disclosure of which is incorporated herein by reference.

Figure 2:
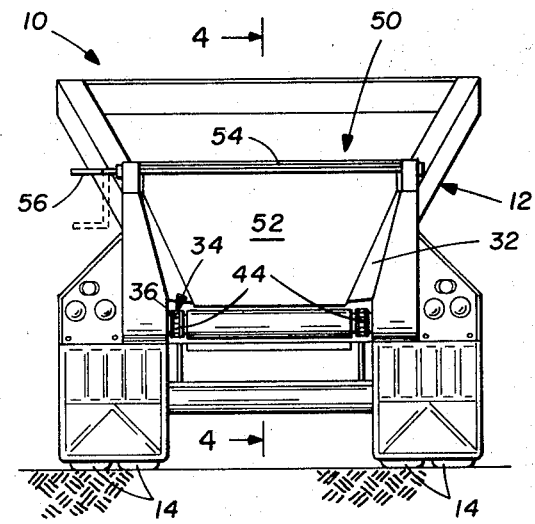
FIG. 2 is a rear view of the embodiment of the invention shown in FIG. 1.

Referring now to FIGS. 2, 3, and 4, the self-unloading particulate material delivery system 10 is equipped with a flow indicator 50 comprising a plate 52 mounted at the rear of the discharge chute 32. The plate 52 is fixed to a shaft 54 which is pivotally supported on the structure of the semitrailer chassis 12. As is best shown in FIGS. 1 and 2, the shaft 54 projects outwardly beyond one side of the chassis 12 in the form of a crank-shaped arm 56. Thus, the arm 56 is constrained to pivotal movement with the plate 52 between positions indicated generally in full lines and in dashed lines in FIGS. 1 and 2.

As has been indicated, the depth of material flowing through the discharge chute 32 under the action of the conveyor 34 depends upon the vertical positioning of the baffle 46 in the particulate material receiving hopper 24. However, the rate at which material is transported out of the hopper 24 depends on the speed of operation of the conveyor 34. The plate 52 of the flow indicator 50 is positioned for engagement by material flowing out of the chute 32 under the action of the conveyor 34 and upon engagement rides on the upper surface of the material. Thus, the pivotal positioning of the plate 52 is indicative of the rate of flow of particulate material out of the hopper 24. The pivotal positioning of the plate 52 is indicated by the pivotal positioning of the crank-shaped arm 56 which is situated for direct observation from a tractor that is connected to the semitrailer chassis 12. Thus, by observing the positioning of the arm 56, the operator of the self-unloading particulate material delivery system 10 can determine the rate of flow of particulate material therefrom.

Figure 6:
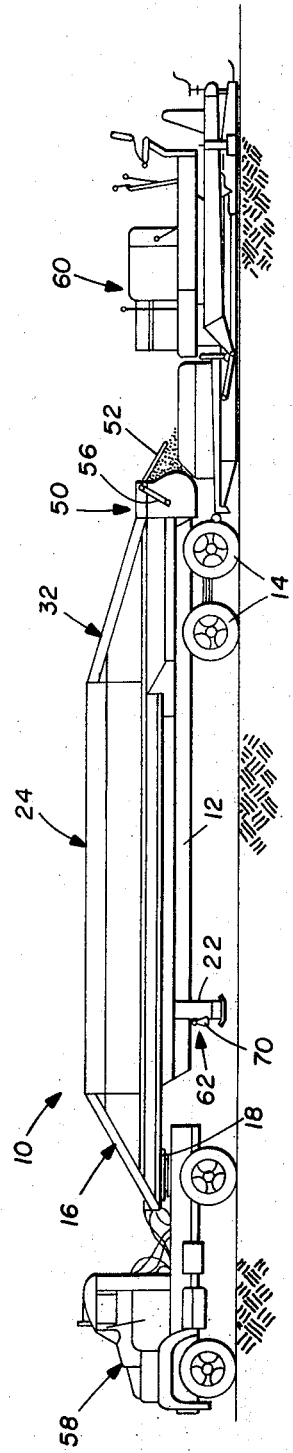
FIG. 6 is an illustration of the operation of the embodiment of the invention shown in FIG. 1.

The operation of the flow indicator 50 will be better understood by referring to FIG. 6 wherein the system 10 is shown connected to a tractor 58 and in the process of unloading particulate material into a lay down machine 60. It has been found to be advantageous to discharge material from the particulate material receiving hopper 24 of the delivery system 10 into a lay down machine at the same rate that the material is being used by the lay down machine. This prevents both undue accumulations of material in the lay down machine and the possibility that the lay down machine will run out of material.

The discharge of particulate material into the lay down machine 60 at the same rate that the lay down machine is using the material is easily accommodated by means of the flow indicator 50 of the self-unloading particulate material delivery system 10. Thus, if particulate material is being discharged at the same rate that it is being utilized by the lay down machine, the angular positioning of the crank-shaped arm 56 will remain constant. On the other hand, if material is being discharged from the delivery system 10 too fast, there will be an accumulation of particulate material in the lay down machine 60. This will cause the plate 52 to ride up as the accumulation of particulate material in the lay down machine increases. As the plate 52 rides up, the crank-shaped arm 56 is pivoted rearwardly, thereby indicating that the speed of operation of the conveyor 34 is too fast. Finally, if the rate of discharge of particulate material from the delivery system 10 is too slow, the accumulation of particulate material in the lay down machine will tend to decrease. This will cause the plate 52 to ride downwardly which in turn will cause the crank-shaped arm 56 to pivot forwardly. Such motion of the arm 56 is an indication that the conveyor 34 of the delivery system 10 is operating too slowly.

The use of the flow indicator 50 is also highly advantageous during unloading from the delivery system 10 otherwise than into a lay down machine, for example, during windrowing, and the like. As has been indicated, the rate at which material is being unloaded is indicated by the angular positioning of the plate 52 and hence by the positioning of the arm 56. Therefore, once the unloading characteristics of any particulate material are known, the rate at which the material is unloaded from the delivery system 10 can be governed by adjusting the speed of operation of the conveyor 34 in accordance with the positioning of the arm 56 of the flow indicator 50.

One of the most important features of the flow indicator 50 comprises the fact that its output, i.e., the angular positioning of the arm 56, is perceivable from the tractor 58. During many unloading operations such as windrowing, etc., it is necessary for an operator to be present in the tractor in order to guide and otherwise operate the tractor so that the material is unloaded at the desired location. However, since the output of the flow indicator 50 is perceivable from the tractor, this requirement does not present a problem since the operator can both control the tractor and control the rate at which particulate material is unloaded while remaining in the tractor. It should be noted that the plate 52 of the flow indicator 50 does not function as a tail gate for the selfunloading particulate material delivery system 10. As is best shown in FIG. 4, particulate material is received and transported in the hopper 24 of the delivery system 10 in the position indicated by the dashed line PM, i.e., entirely within the particulate material receiving hopper 24. Thus, particulate material does not engage the plate 52 in any way until the conveyor 34 is actuated to transport particulate material out of the particulate material receiving hopper 24 and through the discharge chute 32. For this reason there is no need to lock or restrain the plate 52 during loading and/or transportation of particulate material in the delivery system 10.

Figure 5:
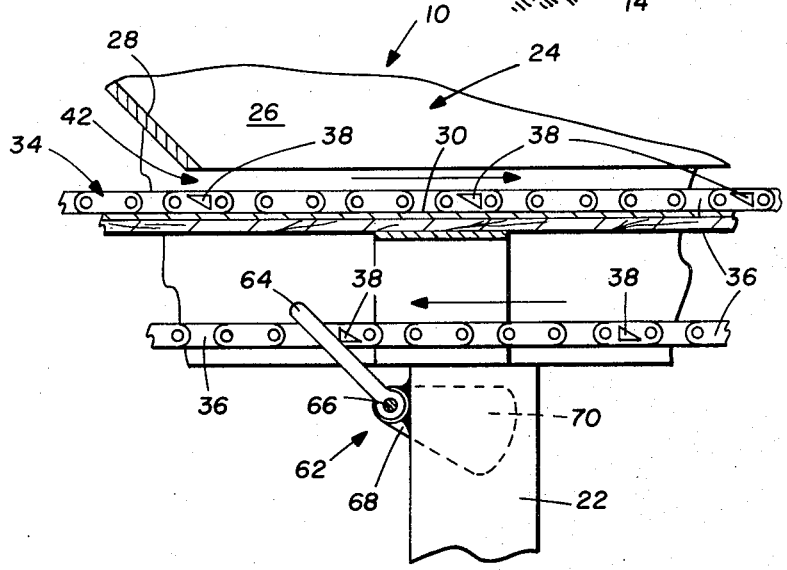
FIG. 5 is an enlargement of a portion of FIG. 4.

The self-unloading particulate material delivery system 10 is also equipped with a conveyor flight positioning indicator 62. As is best shown in FIGS. 3 and 5, the flight positioning indicator 62 comprises a lever 64 which is normally positioned in the path of the flights 38 of the conveyor 34 during movement thereof along the return portion of the course of the conveyor. The lever 64 is fixed to a shaft 66, and the shaft 66 is pivotally supported in a pair of bushings 68 that are secured to the landing gears 22 of the semitrailer chassis 12. A pair of weights 70 are also fixed to the shaft 66 and function to normally position the lever 64 in the path of the flights 38.

It will be understood that whenever one of the flights 38 of the conveyor 34 is situated at a particular location on the return course of the conveyor 34 the lever 64 is rocked out of its normal position by the flight. This in turn causes pivotal motion of the weights 70 from the normal vertical orientation indicated in FIGS. 3 and 6 to the horizontal orientation illustrated in FIGS. 1, 4, and 5. One of the weights 70 is positioned for direct observation from a tractor which is connected to the semitrailer 12 of the delivery system 10. This permits more precise control over the operation of the delivery system 10 in transporting and unloading particulate material.

More particularly, as is best shown in FIG. 4, whenever one of the flights 38 is engaged with the lever 64, another flight 38 is situated in the gap 42 between the lower end of the front wall 28 and the floor 30 of the particulate material receiving hopper 24. Such positioning of a flight has been found to be highly desirable in the case of certain particulte materials having a tendency to flow outwardly through the gap 42 in that it provides additional sealing and thereby prevents loss of such materials through the gap 42.

Another important function of the flight positioning indicator 62 involves the start of unloading from the delivery system 10. As is indicated in FIG. 4, exactly four flights 38 are positioned between the rearmost portion of a load of particulate material PM in the particulate material receiving hopper 24 and the rearwardmost portion of the discharge chute 32. This permits very precise control over the initial discharge of particulate material from the delivery system 10 in that the weights 70 will be pivoted from the vertical orientation to the horizontal orientation exactly four times following the initiation of the operation of the conveyor 34 before material begins to flow out of the discharge chute 32. Thus, an operator can control the beginning of flow from the selfunloading particulate material delivery system 10 by actuating the conveyor 34 and then counting four actuations of the flight positioning indicator 62.

Figure 7:
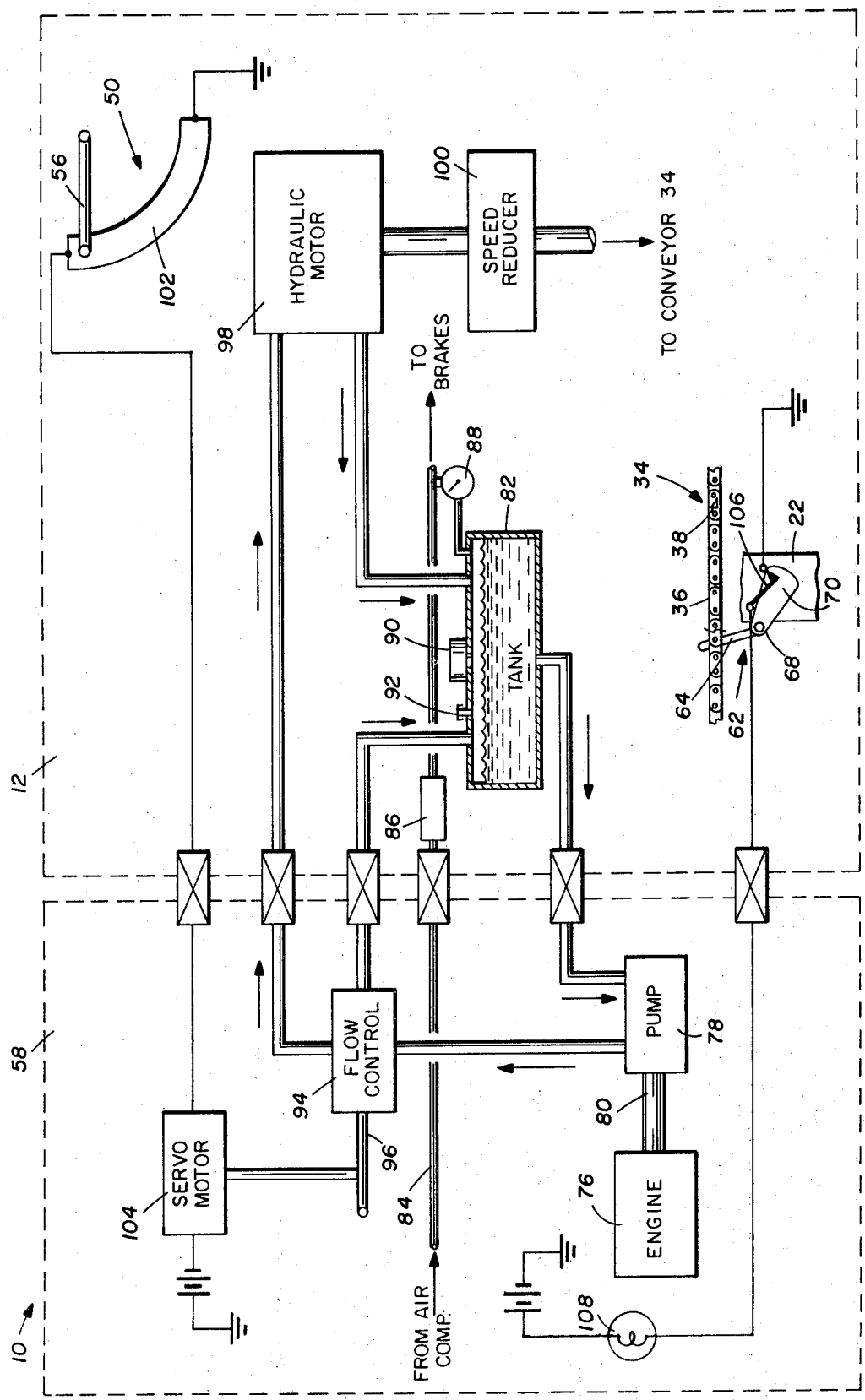
FIG. 7 is an illustration of hydraulic circuitry employed in the embodiment of the invention shown in FIG. 1 and an illustration of a second embodiment of the invention.

The operation of the self-unloading particulate material delivery system will be better understood by referring to FIG. 7. The tractor 58 is equipped with an engine 76 which drives a pump 78 through a conventional power takeoff coupling 80. The pump 78 withdraws hydraulic fluid from a tank 82 which is pressurized by means of a tap in a line 84 extending from the air compressor of the tractor 58 to the brakes of the semitrailer chassis 12. The line 84 is equipped with a regulator 86 which maintains the pressure in the line 84 at a level sufficient to operate the brakes of the trailer, typically 60 psi. The tank 82 is pressurized through a regulator 88 set to provide an output pressure of about 12 psi and is equipped with an airtight filter cap 90. The pressure within the tank 82 is controlled by a pressure relief valve 92 set at about 15 psi. Thus, during the operation of the particulate material delivery system 10, the pressure within the tank 82 is maintained at about 12/15 psi.

The output of the pump 78 is directed to a pressure compensated flow control 94 which functions under the control of a lever 96 to return a portion of the pump output to the tank 82 and to direct the remainder of the pump output to a hydraulic motor 98. The motor 98 drives a speed reducer 100 which in turn drives the conveyor 34 of the self-unloading particulate material delivery system 10. Thus, the speed of operation of the conveyor 34 is controlled by the setting of the lever 96 of the pressure compensated flow control 94.

The foregoing construction permits the operator of the tractor to control the operation of the motor 98 and thereby control the operation of the conveyor 34 from within the tractor 58. As will be understood, this control is in response to the output of the flight positioning indicator 62 with respect to the positioning of a flight 38 in the gap 42 between the lower end of the front wall 28 and the floor 30 of the particulate material receiving hopper 24, and with respect to control over the initial discharge of particulate material from the discharge chute 32. Also, during a particular unloading operation, the flow control 94 is actuated in response to the output of the flow indicator 50 to control the rate at which material is discharged from the particulate material receiving hopper under the action of the conveyor 34.

FIG. 7 also illustrates a second embodiment of the invention. In accordance with the second embodiment, the crank-shaped arm 56 of the flow indicator 50 actuates a slide wire potentiometer 102 to produce an output indicative of the angular positioning of the arm 56. The output of the potentiometer 102 is directed to a servomotor 104 which in turn controls the setting of the control arm 96 of the flow control 94. Thus, in accordance with the second embodiment of the invention, particulate material is caused to flow from the hopper 24 at a constant rate without operator intervention.

Also in accordance with the second embodiment of the invention one of the weights 70 of the flight positioning indicator 62 closes a contact pair 106 whenever one of the flights 38 of the conveyor 34 is positioned in engagement with the arm 64. This illuminates a lamp 108 positioned within the tractor 58. This in turn facilitates actuation of the flow control 94 to position one of the flights 38 in the gap 42 between the front wall 28 and the floor 30 of the particulate material receiving hopper 24 and/or to control the initial discharge of particulate material from the discharge chute 32. Of course, both the flow rate indicator 50 and the flight positioning indicator 62 can be adapted to provide various other outputs, as desired.

In the use of the self-unloading particulate material delivery system 10 the flow control 94 is initially actuated in accordance with the output of the flight positioning indicator 62 to position one of the flights 38 of the conveyor 34 in the gap 42 between the lower end of the front wall 28 and the floor 30 of the particulate material receiving hopper 24. Then, a quantity of particulate material is loaded into the hopper 24. Such particulate material may comprise hot asphalt, slipform concrete, gravel or other aggregate, sand, fertilizer, or the like. Upon loading most particulate materials will occupy the portion indicated by the line PM in FIG. 4 and will not flow into the discharge chute 32.

After the particulate material receiving hopper 24 is loaded, the tractor 58 is operated to transport the semitrailer chassis 12 to an unloading site. Then, the flow control 94 is actuated to initiate operation of the conveyor 34. If precise control over the start of unloading is dictated by particular circumstances, the output of the flight positioning indicator 62 is observed following actuation of the conveyor 34. After precisely four actuations of the flight positioning indicator 62 particulate material will begin to flow from the delivery system 10.

During an unloading operation the flow control 94 is operated to control the speed of operation of the conveyor 34 in accordance with the output of the flow indicator 50. Thus, if material is being unloaded into a lay down machine or the like, the flow control is adjusted to maintain constant positioning of the arm 56 of the flow indicator 50 and thereby assure that particulate material is unloaded at the same rate that it is being used by the lay down machine. Similarly, during a windrowing operation or the like, particulate material is unloaded at a desired rate by observation of the output of the flow indicator 50.

When the hopper 24 has been emptied of particulate material there is no material flowing through the discharge chute 32. This permits the plate 52 to pivot downwardly under the action of gravity until it is positioned as shown in FIGS. 4 and 5. The crank-shaped arm 56 pivots with the plate 52 until it is located in its forwardmost position. Thereafter, if the operation of the conveyor 34 is continued the arm 56 will be rocked slightly rearwardly each time a flight 38 engages the plate 52. Thus, the flow indicator 50 not only provides an output indicative of the rate of flow of particulate material out of the delivery system 10, but also provides an output indicative of the completion of an unloading operation.

From the forgoing it will be understood that in accordance with the present invention a self-unloading particulate material delivery system comprises a particulate material receiving hopper and an endless conveyor for actuation to transport particulate material out of the hopper. The delivery system is equipped with a member mounted for actuation by material flowing out of the hopper under the action of the conveyor to produce an output indicative of the rate of flow of the material. Another member is mounted for actuation by the flights of the conveyor to provide an output indicative of the positioning of the flights. Preferably, the hopper and the conveyor comprise a semitrailer chassis which is connected to a tractor for actuation thereby and both the output of the flow rate indicator and the output of the flight positioning indicator are perceivable from the tractor to facilitate more precise control over the unloading of particulate material.

Although preferred embodiments of the invention have been illustrated in the Drawings and described in the foregoing Detailed Description, it will be understood that the invention is not limited to the embodiments disclosed but is capable of numerous modifications, rearrangements, and substitutions of parts and elements without departing from the spirit of the invention.

What is claimed is

1. A semitrailer for transporting a load of particulate material and delivering the material at a controlled rate which comprises:

a chassis forming a particulate material receiving hopper having downwardly and inwardly sloping side walls;

wheels disposed to the rear of the chassis for supporting the rear end of the semitrailer;

means disposed at the front of the chassis for connecting the semitrailer to a tractor;

chute means extending from the hopper rearwardly beyond the wheels;

conveyor means extending the length of the bottom of the hopper for receiving material by gravity from the hopper and rearwardly through the chute means for transporting material from the hopper to a point to the rear of the wheels;

baffle means extending longitudinally of the hopper for creating a generally horizontal layer of material at a height above the conveyor means which is horizontally compacted to a greater extent than the adjacent material thereunder;

the rear end of the hopper and the chute having an opening substantially corresponding at least to the cross-sectional area of the hopper below said horizontal layer of material such that all material in the hopper below the horizontal layer may move substantially parallel to the conveyor means to the delivery end;

means for controlling the rate at which the conveying means moves and thereby controlling the rate at which the material is delivered; and a member supported on the chassis and extending into the chute means for actuation by particulate material moving through the chute means under the action of the conveyor to produce an output indicative of the rate at which material is being transported out of the hopper.

2. The semitrailer according to claim 1 wherein the output producing member is positioned to ride on the upper surface of particulate material flowing out of the hopper through the chute means.

3. The semitrailer according to claim 2 wherein the member is pivotally supported on the chassis at the extreme rear of the chute means and wherein the output producing means comprises means indicating the pivotal positioning of the member relative to the chassis.

4. The semitrailer according to claim 3 wherein the output producing means further comprises a member extending laterally outwardly from the chassis and mounted for pivotal movement with the output producing member whereby the pivotal positioning of the output producing member may be observed from the tractor of the semitrailer.

5. A vehicle for transporting a load of particulate material and delivering the material at a controlled rate which comprises:
a chassis forming a particulate material receiving hopper having downwardly and inwardly sloping side walls;
wheels disposed to the rear of the chassis for supporting the rear end of the vehicle;
means disposed at the front of the chassis for providing for the support of the front of the vehicle;
chute means extending from the hopper rearwardly beyond the wheels;
conveyor means extending the length of the bottom of the hopper for receiving material by gravity from the hopper and rearwardly through the chute means for transporting material from the hopper to a point to the rear of the wheels;
the rear end of the hopper and the chute having an opening such that material in the hopper may move substantially parallel to the conveyor means to the delivery end;
means for activating the conveyor means and controlling the rate at which the conveying means moves and thereby controlling the rate at which the material is delivered; and
means supported on the chassis and extending into the chute means for actuation by particulate material moving through the chute means under the action of the conveyor to produce an output indicative of the rate at which material is being transported out of the vehicle.

6. The vehicle of claim 5 wherein said vehicle is a semi-trailer and said first mentioned means comprises means for connecting the semi-trailer to a tractor.

7. The vehicle of claim 6 further including a tractor connected to the semi-trailer by said first mentioned means for operation to transport a load of particulate material in the hopper, wherein said means for actuating said conveyor means includes control means operable from the tractor, and wherein said means producing an output indicative of the rate at which material is being transported out of the vehicle produces an output which is perceivable from the tractor.

8. The vehicle of claim 7 wherein the output producing means comprises a member normally positioned in the path of material moving through the rear end of the hopper under action of the conveyor, wherein the moving material cams the member out of its normal position, and wherein the output producing means comprises means responsive to movement of the member out of its normal position for poroducing said output perceivable from said tractor.

9. The vehicle of claim 8 wherein said last mentioned means is a crank-shaped arm extending laterally beyond the chassis.

10. The vehicle of claim 5 wherein the output producing means comprises a member normally positioned in the path of material moving through the rear end of the hopper under action of the conveyor, wherein the moving material cams the member out of its normal position, and wherein the output producing means comprises means responsive to movement of the member out of its normal position for producing an output.

11. The vehicle of claim 5 wherein the chute extends from the rear of the hopper to the extreme rear end of the vehicle and wherein the output producing means comprises a member pivotally supported at the extreme rear end of the chute for actuation by particulate material flowing therethrough under the action of the conveyor, and means extending laterally outwardly from the chassis and responsive to pivotal movement of the member for producing the output.

12. The vehicle of claim 11 further comprising servo means responsive to pivotal movement of the member supported at the rear of the chute for operating the conveyor to transport material through the chute at a predetermined rate.

13. The vehicle of claim 11 wherein said last mentioned means is a crank-shaped arm extending laterally beyond the chassis so as to be perceivable from a location in front of the vehicle.

* * * * *